Jan. 11, 1927.
K. L. HERRMANN
INTERNAL COMBUSTION ENGINE
Filed Feb. 16, 1925
1,613,610
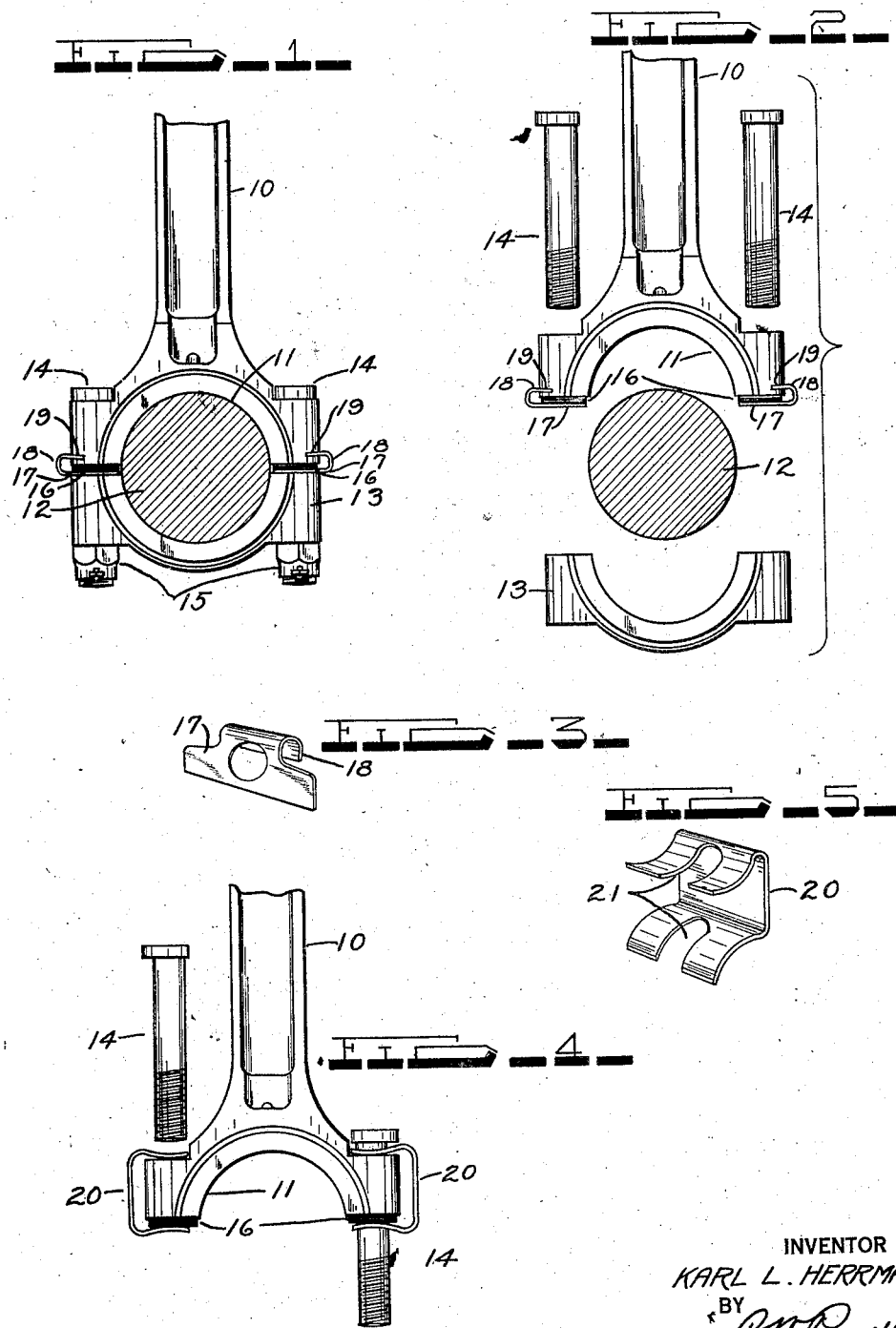
INVENTOR
KARL L. HERRMANN
BY
ATTORNEY Patented Jan. 11, 1927.

1,613,610

UNITED STATES PATENT OFFICE.

KARL L. HERRMANN, OF DETROIT, MICHIGAN, ASSIGNOR TO THE STUDEBAKER CORPORATION, OF SOUTH BEND, INDIANA, AND DETROIT, MICHIGAN, A CORPORATION OF NEW JERSEY.

INTERNAL-COMBUSTION ENGINE.

Application filed February 16, 1925. Serial No. 9,575.

This invention relates to internal combustion engines and more particularly to devices used in connection with engine connecting rods and especially to means which assist in the tearing down and assembling of the bearings therefor.

Heretofore, automobile mechanics when assembling a torn down motor have experienced considerable difficulty in replacing the exact number of connecting rod bearing shims. Very frequently, when the bearing shims are removed, part of them are lost or misplaced and much time is lost in determining the necessary number or thickness of shims to insert between the mating surfaces of the bearings. In doing this, it is necessary to remove the bearing bolts and bearing cap several times to get the correct fit between the connecting rod bearings and the crankshaft.

Therefore it is one of the objects of the present invention to provide engine connecting rods with a new and novel means for holding the bearing shims in place after the bearing is disassembled.

Another object is to provide a connecting rod with a spring member for retaining the bearing shims in place after the bearing is disassembled.

A further object is to provide a connecting rod bearing with a shim retaining member, a portion of which serves as a shim when the bearing is assembled and which retains the shims in position when disassembled.

A still further object is to provide a shim retaining member adapted to slip over both the top of the connecting rod bearing and the bearing shims whereby the shims may be held in place while the bearing is being torn down or assembled.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several views.

Figure 1 is a side view of the crank end of a connecting rod showing the same in assembled position on the crank shaft.

Figure 2 is a side view showing the parts of Figure 1 in disassembled position and illustrating the manner in which the shim holding device holds the bearing shims in place.

Figure 3 is a perspective view of the shim holding device.

Figure 4 is a side view of a disassembled connecting rod showing a modified form of the present invention.

Figure 5 is a perspective view of the modification shown in Figure 4.

The connecting rod 10, in connection with which the present invention is shown, is of the conventional type having a semi-circular bearing surface 11 which is adapted to receive the crank shaft 12 and which is adapted to be closed by the complemental bearing cap 13 secured thereto by the usual bolts 14 and nuts 15. As is the usual practice a plurality of relatively thin shims 16 are interposed between the joining surfaces of the cap 13 and rod 10 to facilitate fitting of the same to the crank shaft 12, and as previously explained, it is these shims that often become lost or misplaced when tearing down an engine, with resulting loss of time and labor. To prevent the loss and misplacement of these shims, the present invention provides the shim retainers 17 which are formed of a spring metal, preferably to the same shape as the shims 16, and each of which is provided with an extending portion 18 bent back over the main portion to the shape of a hook. The lower or main portion is seated against the bottom face of the lowest shim 16 and the hook portion 18 is sprung up into a slot 19 formed in the edge of the connecting rod 10, the resiliency of the retainer 17 drawing the shims 16 up against the lower face of the cap engaging portion of the rod 10 and holding the shims in such position when the cap 13 is being assembled or disassembled as shown in Figure 2.

Each retainer 17 in this construction acts, in effect, as a shim itself, being in position whether the rod is assembled or disassembled, and prevents accidental displacement of the shims 16 when the cap 13 is removed.

If it is desired to add an extra shim 16, or to remove one, the retainers 17 may be sprung off, the necessary addition of subtraction made, and the retainer can then be snapped back in place.

This gives the mechanic tearing down the job the assurance that when he removes the bolts 14 from the rod 10 and the bearing cap 13, the shims 16 will remain in place and he need not fear losing the same, or will not be required to remove the cap 13 several times before he obtains the correct fit. When he assembles the rod 10 he merely places the same on the crank shaft 12, inserts the bolts 14, puts on the bearing cap 13, and tightens down the nuts 15, leaving the shim retainers 17 in place.

Although the retainers 17 in the drawing are shown as securing the shims 16 to the rod 10, it is quite apparent that a slot similar to the slot 19 may be formed in the cap 13 and the retainer 17 may be reversed to hold the shims 16 to the cap 13 instead of the rod 10.

In the Figure 4 is shown a modification of the retainer 17 previously described, which comprises a resilient U-shaped member 20 made of spring metal and provided with slots 21 of a width slightly greater than the thickness of the connecting rod bolts 14. In using this device the mechanic first removes the nuts 15 and bearing cap 13 and then raises the bolts 14 a sufficient distance to slip the retainer 20 underneath the head and around the shank portion, the bottom portion of the retainer 20 resting against the lowest of the shims 16. When the retainers 20 are in this position the bolts 14 can be removed, thereby holding the shims 16 in place, guarding against loss or misplacement.

As with the retainers 17, it is understood that the retainers 20 may likewise be adapted to hold the shims 16 on the bearing cap 13 when in disassembled position.

It can be seen from the foregoing that the shim retainers described are simple in construction, economical to manufacture and provide a very efficient means for holding connecting rod bearing shims in place while an engine is being torn down.

Formal changes may be made in the specific embodiment of the invention described without departing from the spirit and substance of the broad invention the scope of which is commensurate with the appended claims.

What I claim is:—

1. For use in an internal combustion engine provided with a connecting rod having a semi-circular bearing surface, a flat surface adjacent thereto, a cap provided with a surface mating with said flat surface, and shims interposed between said flat surfaces; a resilient clamping member having a portion for engaging said shims and a portion spaced from said first portion engaging said connecting rod to retain said shims against said rod when said cap is separated therefrom.

2. For use in an internal combustion engine provided with a connecting rod comprising a rod portion and a cap portion, and shims interposed between said portions; a resilient clamping member for engaging said shims and having a spaced part engaging one of said portions to retain said shims in position on said portion when said portions are separated.

3. For use in an internal combustion engine provided with a connecting rod comprising a rod portion, a cap portion, bolts for drawing said portions together, and shims for positioning said portions in spaced relation; a shim retainer comprising a reversely bent hook end engageable with one of said portions to hold said shims against said portion when said rod portion and cap portion are separated.

4. For use in an internal combustion engine provided with a crank shaft, a connecting rod, a bearing cap for securing said connecting rod to said crank shaft, and shims positioned between said rod and said cap; resilient shim retaining members each comprising a portion conforming in shape to and bearing against said shims and a reversely bent portion engageable with a notch in said rod whereby to hold said shims against said rod independently of said cap.

Signed by me at Detroit, Michigan, U. S. A., this 12th day of February, 1925.

KARL L. HERRMANN.